(12) United States Patent
Juster et al.

(10) Patent No.: US 7,653,761 B2
(45) Date of Patent: Jan. 26, 2010

(54) AUTOMATIC DELIVERY OF PERSONALIZED CONTENT TO A PORTABLE MEDIA PLAYER WITH FEEDBACK

(75) Inventors: Josh Juster, Seattle, WA (US); Daniel Giambalvo, Seattle, WA (US); Oliver R. Roup, Seattle, WA (US); Karim Farouki, Seattle, WA (US); Mark McNulty, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 11/375,772

(22) Filed: Mar. 15, 2006

(65) Prior Publication Data

US 2007/0220552 A1    Sep. 20, 2007

(51) Int. Cl.
*G06F 3/00* (2006.01)
*H04N 5/91* (2006.01)

(52) U.S. Cl. .......................................... 710/18; 386/83
(58) Field of Classification Search ................... 710/18; 386/83
See application file for complete search history.

(56) References Cited

U.S. PATENT DOCUMENTS

| | | | | |
|---|---|---|---|---|
| 5,616,876 | A * | 4/1997 | Cluts ............................ | 84/609 |
| 5,819,160 | A * | 10/1998 | Foladare et al. ............... | 455/45 |
| 5,931,901 | A * | 8/1999 | Wolfe et al. .................. | 709/206 |
| 6,324,338 | B1 * | 11/2001 | Wood et al. ................... | 386/83 |
| 7,321,923 | B1 * | 1/2008 | Rosenberg et al. .......... | 709/217 |
| 2001/0025259 | A1 * | 9/2001 | Rouchon ..................... | 705/26 |
| 2002/0019858 | A1 * | 2/2002 | Kaiser et al. ................ | 709/219 |
| 2003/0182100 | A1 * | 9/2003 | Plastina et al. ................ | 704/1 |
| 2005/0124248 | A1 * | 6/2005 | Hyvonen .................... | 442/268 |
| 2005/0165779 | A1 * | 7/2005 | Kaiser et al. ................... | 707/6 |
| 2006/0206478 | A1 * | 9/2006 | Glaser et al. ................... | 707/5 |
| 2007/0124248 | A1 * | 5/2007 | Stoker ......................... | 705/51 |

OTHER PUBLICATIONS

Don E. Descy, 'All Aboard the Internet: Podcasting: Online Media Delivery . . . With a Twist', Sep. 2005, Pags 4-6.*

* cited by examiner

*Primary Examiner*—Henry W. H. Tsai
*Assistant Examiner*—Hyun Nam
(74) *Attorney, Agent, or Firm*—Woodcock Washburn LLP

(57) ABSTRACT

Automatic download of personalized media content to a portable media device based on user preferences is disclosed. A media service can evaluate content on a user's media device as well as user action related thereto to infer the user's preferences, and can automatically aggregate and download content that is relevant to the user's tastes. The user can subscribe to, for example, playlists generated by the media service, another user's playlist(s), a simulated radio station, etc., and can receive content updates thereto at predefined intervals and/or upon release of the updates. In this manner, the user can periodically receive media content that is personalized to the user without requiring the user to explicitly request the content or synchronize to a PC.

20 Claims, 10 Drawing Sheets

AUTOMATIC DELIVERY OF PERSONALIZED CONTENT TO A PORTABLE MEDIA PLAYER WITH FEEDBACK

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

As computing devices have continued to develop and their use have become more widespread, peripherals associated with such devices have also become commonplace. For instance, typical computing devices include a plurality of ports (e.g., wired or wireless) into which peripherals can be attached and utilized in connection with the aforementioned computing devices. More particularly, attachable peripherals can include printers, keyboards, portable music/video players and recorders, cameras, video cards, speaker systems, personal digital assistants (PDAs), portable telephones, smart phones, or any other suitable computer peripheral. These devices can be physically coupled to a computing device by way of ports (e.g., USB ports, printer ports, . . . ), or can be communicatively coupled over a wireless link. This interaction of peripherals with computing devices has rendered such computing devices even more valuable in terms of user efficiency.

With regard to portable media devices, improved memory capacity and size reductions have made possible digital media services that can provide myriad media files (e.g., audio, video, music, . . . ) to media devices that fit in the palm of a user's hand. Conventional media management software allows users to synchronize content with a personal library and a portable device by automatically updating the device when content is added or removed from the library. Although the synchronization is automated, the library itself is only changed when a user explicitly downloads or deletes content on his/her PC. There exists a need in the art for systems and/or methodologies that overcome the above-mentioned deficiencies.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein are one or more techniques whereby media (e.g., music, video, . . . ) can be personalized to a subscribing user's interests and automatically downloaded from a media service to the user's media device without requiring the user to expressly request the personalized content. In particular, the instant innovation describes how a user actions and history can be utilized to facilitate generating sets of personalized content that can be downloaded to the user's device upon the occurrence of a triggering event. For example, if the media service is a music service that provides song downloads to subscribers, then personalized content can be automatically pushed to a subscriber's device upon a triggering event. A triggering event can be, for example, a specified time, such as 5:00 am each morning. Other triggering events can include a recommendation from the music service, an update of a playlist(s) to which the user has subscribed, generation of a playlist by a second party to whose playlist(s) the user has subscribed, a recommendation from a "friend" in a user's buddy list, or any other suitable trigger that prompts an automatic download of personalized content to the user's device.

The personalization of the content can be based on user preferences, which can be inferred from, for instance, user history of plays or skips of a particular song or artist, ratings of songs or artists made by the user or by all or a subset of subscribers to the music service, content in a media library associated with the user's media device, etc. As the user interacts with the media device, content thereon is modified, user actions change, etc., and thus the user's profile dynamically changes with time. As the user's profile changes, feedback to the music service can facilitate continuously updating the user's profile, which in turn permits personalized content generated for automatic download on a subsequent triggering event to be up-to-date with the user's tastes and/or preferences. In this manner, the user can be provided with fresh, new personalized content on a regular basis without having to explicitly request content that matches the user's tastes.

Accordingly, the invention disclosed and claimed herein, in one aspect thereof, comprises a computer-implemented system that facilitates inferring a user's preferences and generating a set of personalized media files for automatic download to the user's media device from a media service to which the user subscribes. A media library can be associated with the media device to store content that has been downloaded, either automatically as personalized content or expressly by the user. The media device an comprise a processor and memory component that facilitate logging and storing user actions with regard to media files (e.g., downloads, file access events, frequency thereof, . . . ), which information can be provided to the media service periodically to permit the media service to update a user profile associated with the user. Subsequent automatic downloads of content can be personalized based on the updated usage information.

According to another aspect, a method can comprise generating personalized media content and automatically downloading the content to a user device upon the occurrence of a triggering event. Content personalization can be based on user activity, and downloaded content can be prioritized based on various factors. For example, user-downloaded content can be ranked higher than automatically downloaded content to facilitate determining which content to earmark for removal from the user's device in the event that device memory is full. In this manner, explicitly downloaded content can be preserved on the user's device in favor of deleting personalized content when necessary. The user can additionally be provided with an opportunity to approve any file deletion prior to removal from the device to ensure that desired content is retained in device memory.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
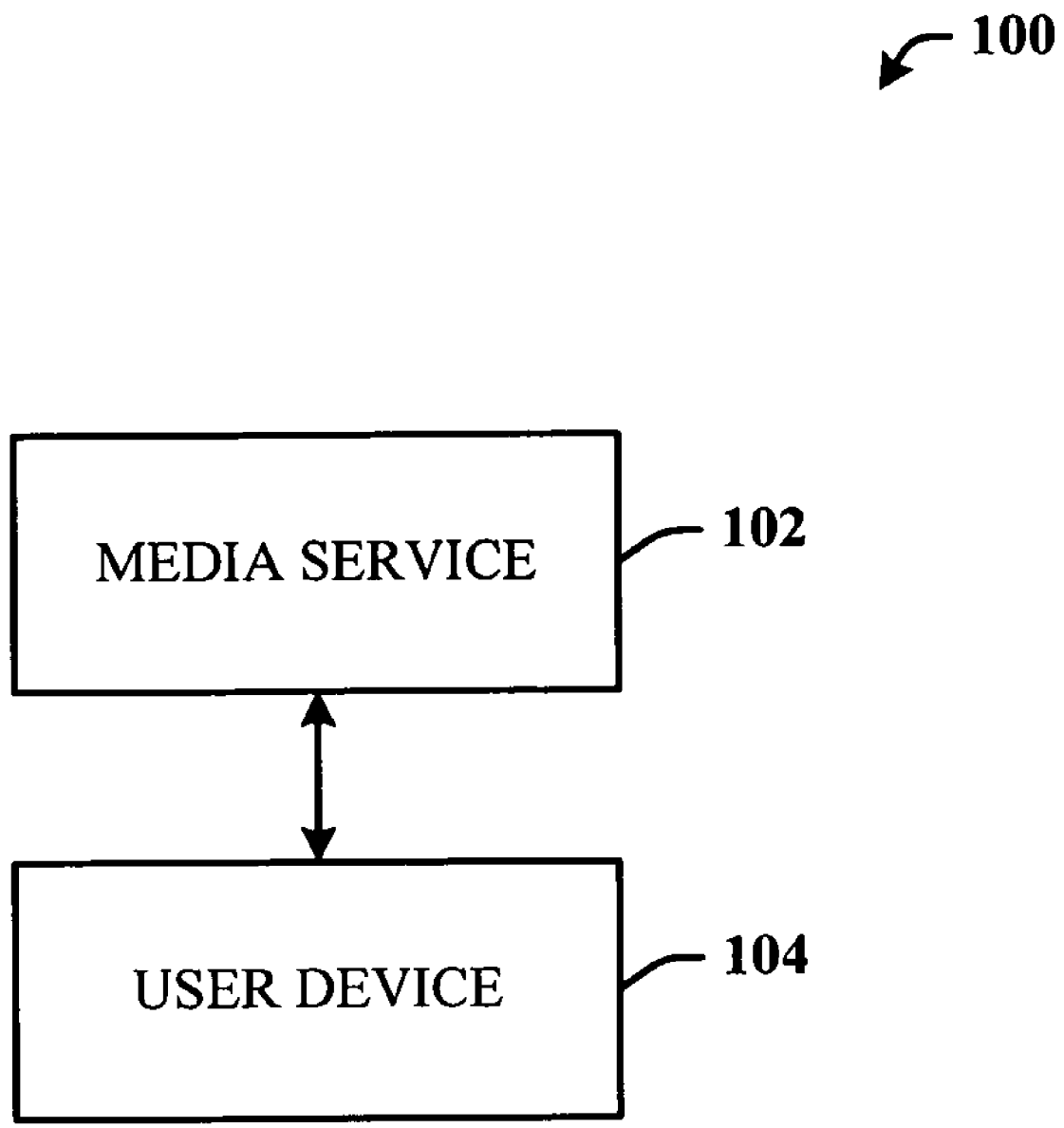
FIG. 1 illustrates a computer-implemented system that facilitates automatically pushing media to a user device, in accordance with various aspects.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a computer-implemented system 100 that facilitates automatically pushing media to a user device, in accordance with various aspects. The system 100 comprises a media service 102 that is in bidirectional communication with a user device 104. The user device 104 can be, for example, portable media device such as an MP3 player, a cellular phone, or any other suitable device for receiving and storing media files for playback. According to an example, the media service can be a music service, such as an Internet service that provides music downloads to subscribers. A user can choose, for example, one or more music playlists that match the user's tastes, and can automatically receive new music when it becomes available. Additionally, a user can automatically receive new music based on, for instance, the user's existing music collection and usage behavior. According to this example, user device 104 might have stored therein 1,000 songs, of which 10 are played by the user at a much higher frequency than the other 990. In such a case, new songs in the same music genre as the 10 highly-played songs, or by the same artist, etc., can be automatically downloaded to the user device 104 from the music service upon becoming available (e.g., when the song is released, . . . ). In this manner, users can awake in the morning to updated, fresh, and personalized music content downloaded to their user devices. It will be appreciated that the described innovation is not limited to music content, but rather can comprise any suitable type of downloadable content (e.g., video, games, or the like).

According to various aspects, the system 100 can facilitate automatically pushing music from media service 102 to the user device 104 upon a triggering event. For instance, a triggering event can be a recommendation by the media service 102 based on user preferences, which in turn can be inferred based on factors such as, but not limited to, a number of times a user plays (and/or does not play) a media file already stored in the user device 104, content stored in the user device 104, media file ratings (e.g., by the user, by all or a portion of users subscribing to the media service 102, etc.

According to another example, a user can download another user's playlist (e.g., a playlist created, updated, and/or maintained by another user), and can automatically receive media added to the playlist when the other user alters the playlist. For instance, user A can create playlist A on user A's media device. The playlist can be created/updated while user A's device is online (e.g., connected to the media service 102), in which case the media service 102 can immediately store playlist A. Additionally or alternatively, user A can create playlist A from media stored in user A's media device while offline, and playlist A can be retrieved and/or stored at media service 102 upon a next synchronization of user A's device with the media service 102. User B can log onto the media service 102, and can decide to download playlist A (e.g., in the event that playlist A is pleasing to user B). Subsequently, user A can update playlist A by adding songs to playlist A, which can act as a triggering event. Upon the update of playlist A by user A, user device 104 (e.g., user B's device) can automatically receive downloads comprising the media files added to playlist A by user A. In the event that user A has deleted media files from the playlist, user B can be offered the option to delete such files from user device 104. For instance, user B can be presented with an option to always update playlist A precisely according to user A's modifications, such as by setting a "user preference." Additionally or alternatively, user B can select permit deletion of a file only upon express approval (e.g., user B can be presented a "delete file?" prompt that user B must approve before the file is deleted, . . . ). According to a related example, user B can subscribe to all playlists generated and/or maintained by another user, such as user A. Updating of a user A playlist can act as a triggering event to prompt download(s) to user device 104. Yet another aspect can relate to receiving media files from "friends," such as other users that user B has listed in a buddy list or the like, which can act as triggering events.

According to another aspect, the system 100 can facilitate automatic file downloads based on feedback from user device 104. For example, the user device 104 can be a PC-based media player (e.g., video, music, . . . ), a portable media device, etc., and can facilitate maintaining a feedback loop between itself and the media service 102. For instance, the user device 104 can provide usage data that can be utilized by the media service 102 when generating new media recommendations to the user device 104. Media management software can then be employed to facilitate adding/removing media files to/from the user device 104.

A related example can comprise prioritizing recommended media files as being secondary to files explicitly downloaded by a user. For instance, a user can download desired media files at will, and recommended or automatically downloaded files will not be permitted to replace explicitly downloaded files. According to this example, where a user has downloaded files to user device 104, and the device 104 is full or nearly full, the media service 104 can remove files that were not explicitly downloaded by the user (e.g., other automatically downloaded files can be removed) in order to free up space for the newly-recommended files). For example, non-explicitly downloaded files can be removed according to pre-defined parameters (e.g., least-recently played file, lowest-rated file, least-related-to-user-preferences, . . . ). In this manner, files that the user has downloaded explicitly can be retained in the device despite forced media downloads.

According to other aspects, automatically downloaded personalized content can be marked to indicate whether the content contains explicit lyrics. Additionally, parental controls can be incorporated into system 100 to facilitate excluding certain content from being downloaded to a particular user device 104, if desired.

Figure 2:
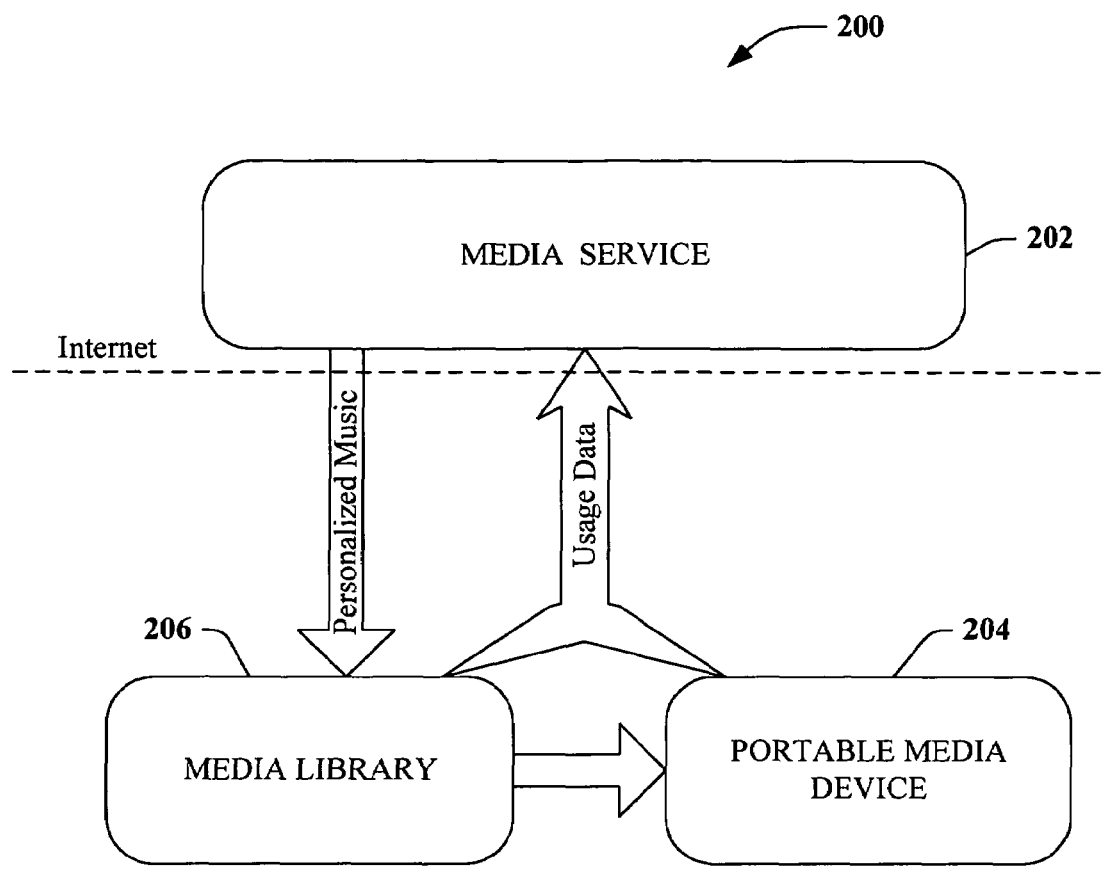
FIG. 2 illustrates a system that facilitates automatic transfer of personalized music content to a user's media library and/or portable music player, in accordance with various aspects.

FIG. 2 is an illustration of a system 200 that facilitates automatic transfer of personalized music content to a user's media library and/or portable music player, in accordance with various aspects. The system 200 can comprise a music service 202 that can provide music files (e.g., songs, MP3s, music videos, MPEGs, WAVs, . . . ) for download to one or more portable media devices 206 and/or associated media libraries 204 via the Internet or some other interface. For instance, a user can explicitly download a song to the portable media device 206 or to the media library 204, or both. The media library 204 can reside in the portable media device 206 (e.g., as a memory component, . . . ) or can be a separate entity from the portable media device 206. If separate, the portable media device 206 can communicate with the media library 204 to retrieve songs upon request.

Additionally, the music service 202 can automatically download personalized content to the media library 204, which can be content that is not explicitly requested by the user. For example, a user can provide information related to the user's music preferences (e.g., genre, artist, time period, . . . ), which information can be utilized by the music service 202 to determine content that has a high likelihood of being pleasing to the user. Additionally, personalized content can be generated and/or downloaded in response to one or more triggering events, in a manner similar to that described above with regard to FIG. 1. For instance, personalized content can be playlist-based, whereby a user A can download a playlist created by user B. User B can be another customer/subscriber to the music service 202, a content editor, and automated process (e.g., "Top Songs," "Top Songs by Artist X," "Sounds Like (insert local radio station)," etc. Upon an update of the downloaded playlist by user B (e.g., a triggering event), user A can automatically receive songs added to the playlist. For example, the "Top Songs" playlist can comprise a number of top songs (e.g., top 10, top 25, top 100, . . . ) that can be updated daily, weekly, or according to any other suitable schedule, and updating of the playlist at the music service 204 can act as a trigger to cause automatic updating of the playlist in the portable media device 206. According to another aspect a "Sounds Like xxx.xx FM" can comprise a playlist of songs similar to a particular genre of music played on xxx.xx FM. Additionally or alternatively, the "Sounds Like . . . " playlist can comprise an actual playlist of songs played on the particular radio station over a predetermined time period. This aspect can be facilitated by permitting an additional subscription, a premium subscription, or the like, if desired.

According to another example, personalized content downloaded from the music service 202 to the media library 204 can be user-based. For example, user A can subscribe to User B (e.g., another customer/subscriber, a content editor, etc.) and can automatically receive any playlists (and songs therein) that are created by user B. An update of a user B playlist can serve as a trigger to automatically download songs, corresponding to the updates, to user A's portable device. In a similar manner, personalized content can be user-recommended, such as where user A can receive automatic downloads of songs, albums, playlists, or other media that are recommended to user A by user B. To further this Example, user B can be a content editor, such as a playlist generator sponsored or employed by a manufacturer or company (e.g., a shoe manufacturer, a sports apparel manufacturer, an advertising company, . . . ). For instance, in the event that the content editor is associated with an athletic shoe manufacturer, the editor can update a workout playlist (e.g., comprising upbeat song tracks, . . . ) according to a predetermined schedule (e.g., weekly, daily, . . . ), which can be automatically downloaded to the portable media player 206 and/or the media library 204 whenever the playlist is updated. According to another example, user B can be content editor associated with a company that sells aroma-therapy products, and can generate playlists comprising soothing song tracks and the like. It will be appreciated that the foregoing examples are provided for illustrative purposes only, and are not intended to limited the types and/or numbers of playlists, companies, products, etc., that can be employed in conjunction with the various aspects presented herein.

According to yet another example, personalized content can be music-service-recommended. For instance, the music service 202 can employ a plurality of factors to facilitate evaluating content for automatic download to the media library 204, and thereby to the portable media device 206. According to this example, content already residing in the user's media library 204 can be evaluated to glean information related to user preferences and the like. Similarly, information related to a number of times a particular song is played or is skipped, as well as song rating information (e.g., by the user, by all or a subset of users who have downloaded the song, . . . ), can be evaluated to facilitate inferring personalized content for the user. Still furthermore, the personalized content can be music-service-device-recommended, which is similar to music-service-recommended personalized content except that such a recommendation is independent of the music service. This latter recommendation can be achieved by evaluating information associated with files in the portable media device 206, which information can include the above (e.g., ratings, play events, skip events, . . . ) as well as explicitly downloaded songs. Such information is illustrated by the "Usage Data" arrow connecting both the media library 204 and the portable media device 206 to the music service block 202.

According to yet another aspect, as a user manages and interacts with the media library 204 and or content on the portable music device 206, the user's "overall taste profile" and/or "portable music player profile" can be updated. These changes can directly influence the songs that are recommended and automatically downloaded by the music service 202 and, as a result, can affect the content placed into the user's media library 204 and/or portable media player 206. If a user adds content to a portable music player that has recommended content on it, the user-added content is "explicitly added content" that will take priority over recommended or personalized content, and the personalized content that was pushed to the device can be removed. Similarly, if a user's taste changes, a list of recommended music can change and, as a result, content pushed to the device can be removed.

Still other aspects relate to providing user prompts for user approval, ratification, or the like, of added content, content slated for removal, etc. For instance a user can be presented with a list of songs that are slated for removal to make room for newly downloaded content, and can approve deletion thereof either wholesale or individually. In this manner a user can selectively retain songs or other media that may have been previously downloaded as personalized content, explicitly downloaded, or otherwise.

Figure 3:
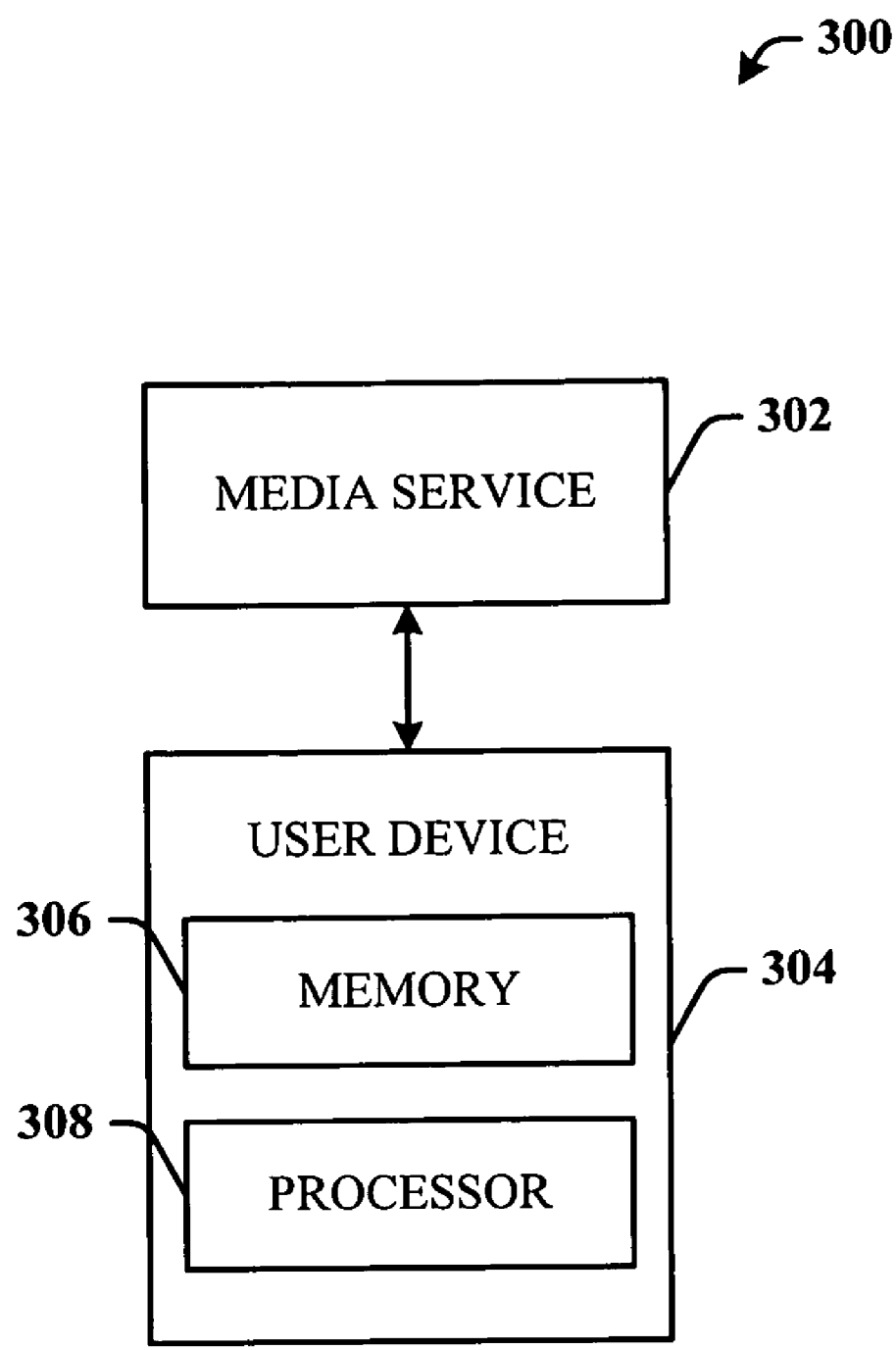
FIG. 3 illustrates a computer-implemented system that facilitates providing automatically-downloaded personalized content to a user device, in accordance with one or more aspects.

FIG. 3 illustrates a computer-implemented system 300 that facilitates providing automatically downloaded personalized content to a user device, in accordance with one or more aspects. The system 300 comprises a media service 302 similar to the media service of FIG. 1, which is operationally and bi-directionally coupled to a user device 304 (e.g., a portable media player, a cellular phone, . . . ). The user device 304 can comprise each of a memory 306 and a processor 308 to facilitate performing the various functions described above. The processor 308 can be a processor dedicated to analyzing data that has been received and/or updated at user device 304, a processor that controls one or more components of system 300, and/or a processor that both analyzes data associated with the user device 304 and controls one or more components of system 300.

It will be appreciated that the memory 306 can be a data store that can store various data related to the system 300. The data store can provide storage for downloaded media files, usage data for uploading to the music service 302, playlist subscriptions, protocols related thereto, etc. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data stores of the subject systems and methods are intended to comprise, without being limited to, these and any other suitable types of memory. In addition, it is to be appreciated that such data stores can be a server, a database, a hard drive, and the like.

Figure 4:
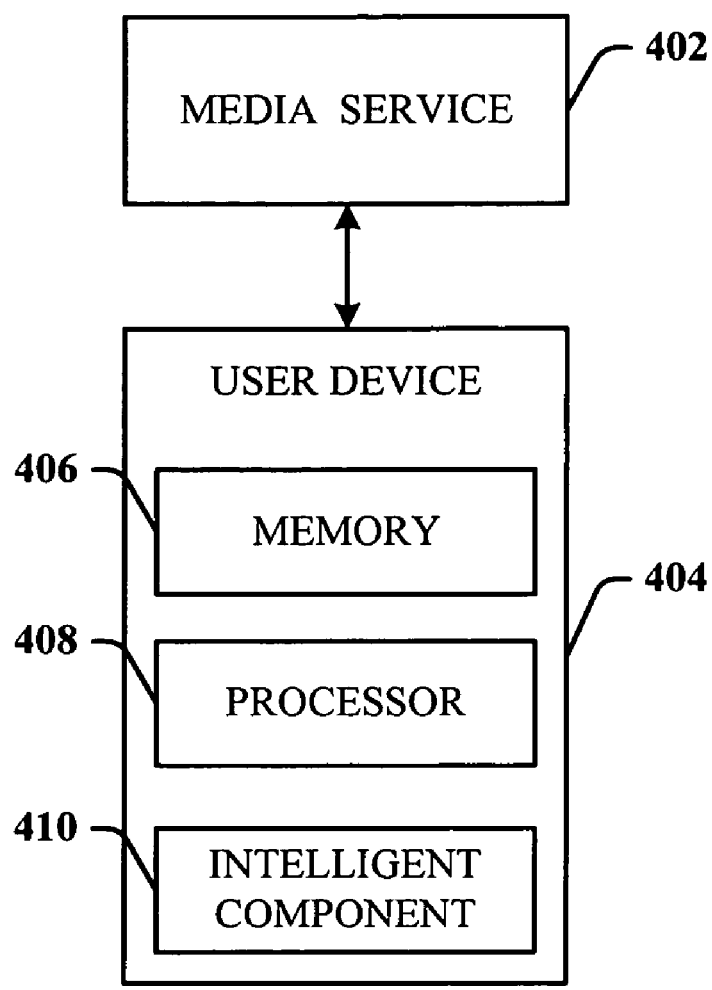
FIG. 4 illustrates a system that facilitates providing automatic media file downloads based on user preference information, in accordance with one or more aspects.

FIG. 4 illustrates a system 400 that facilitates providing automatic media file downloads based on user preference information, in accordance with one or more aspects. The system comprises a media service 402 that is operatively coupled to a user device 404 (e.g., a cell phone, a portable media player, . . . ) via an interface (not shown) such as the Internet. The user device 404 can comprise a memory 406 and a processor 408, as described above with regard to FIG. 3. Additionally, the user device 404 can comprise an intelligent component 410 that facilitates making inferences associated with providing automatically downloaded personalized content to the user device 404. Although intelligent component 410 is depicted as residing in the user device 404, it is to be appreciated that a similar component can be provided in the media service 402 to facilitate making inferences regarding appropriate personalized content for a particular user (e.g., based on the user's usage data, preferences, . . . ).

It is to be understood that the intelligent component 410 can facilitate reasoning about or inferring states of the system 400, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Such classification schemes can be utilized by the subject systems and/or methods to facilitate inferring states and/or actions related to personalized content organization, selection, download, etc.

According to an example, intelligent component 410, in conjunction with processor 408 and memory 406, can determine that explicitly downloaded content has not been played on the user device 404 for a time period that is longer than a predetermined threshold time period (e.g., a week, a month, . . . ), and can infer that the user does not wish to review the media again. In such a situation, the inference can be employed to permit automatic removal of the media in the event that storage space in the memory 406 needs to be cleared for incoming personalized media content. Additionally or alternatively, intelligent component 410 can infer that the user will desire to approve the removal of the content prior to deletion because the content was explicitly downloaded. In such a case, the intelligent component 410 and/or processor 408 can present the user with a prompt to expressly approve deletion of the file before it is removed from the memory 406 of the user device 404.

According to another example, the intelligent component can infer that the user will prefer to receive entire album downloads based on information related to, for instance, previous song downloads from a particular artist. For instance, where the user typically downloads or frequently plays a majority of songs of each album by a particular artist, the intelligent component 410 can infer that automatic download of entire albums by that artist (e.g., as albums become available, . . . ) can more efficiently serve the user. In such a case, intelligent component 410 can provide an instruction to music service 402 to download whole albums by the artist of interest. It will be appreciated that the foregoing examples are illustrative in nature and are not intended to limit the number of inferences that can be made by intelligence component 410 or the manner in which such inferences are made.

FIGS. 5-8 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Figure 5:
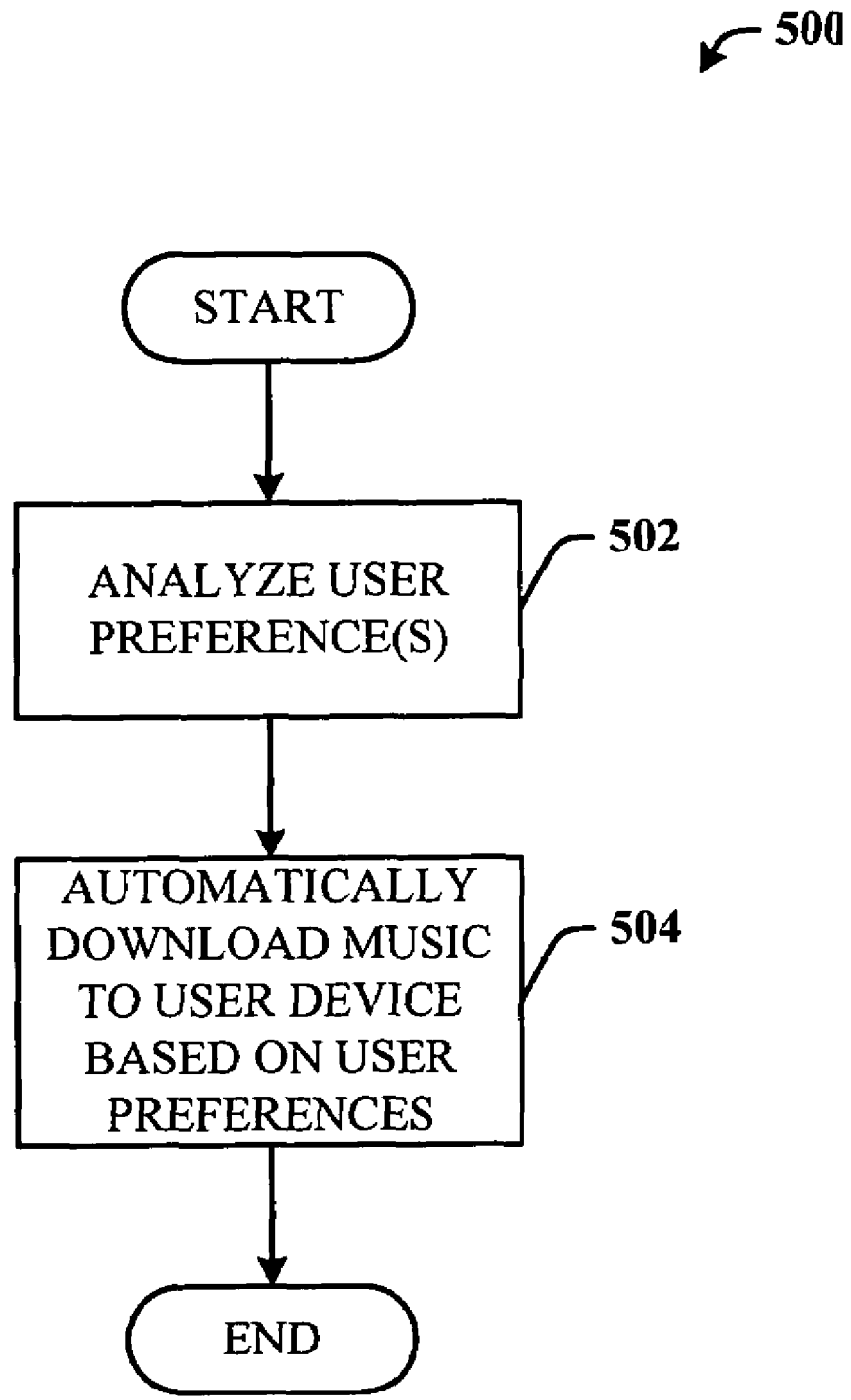
FIG. 5 is an illustration of a methodology of providing personalized content to a user via automatic download based on user preferences, which may be explicit or implicitly determined, in accordance with various aspects.

FIG. 5 illustrates a methodology of providing personalized content to a user via automatic download based on user preferences, which may be explicit or implicitly determined, in accordance with various aspects. At 502, user preferences can be analyzed to permit a compilation of personalized media content for download to a subscribing user's device (or an associated media library), without explicit request by the user. For instance, user preferences can be explicit (e.g., user-entered preferences for a particular artist, music genre, . . . ), or can be implicit (e.g., based on previous downloads, file usage, lack thereof, . . . ). Implicit user preference information can thus be derived in the various manners set forth with regard to FIGS. 1 and 2. For instance, user preferences for personalized content can be playlist-based, where user A downloads a playlist generated and maintained by user B (e.g., another subscriber, a content editor, . . . ) and receives automatic updates to the playlist. According to another example, the personalized content can be user based, such as where user A "subscribes" to user B and receives downloads comprising all playlists by user B and updates thereto. Moreover, personalized content can be user-recommended, such that user A can receive automatic downloads of songs, albums, playlists, etc., that have been recommended by user B (e.g., in the event that user A has approved user B as a party from which user A will accept recommended content, . . . ).

According to other examples, personalized content for download can be based on recommendations from the music service, the user's device, etc., based on several deterministic factors. Such factors can include, without being limited to, the user's present music collection, (e.g., stored in the user's device or media library), a number of times a particular song has been played, a number of times a particular song has been skipped (e.g., as indicating a lack of preference for that particular artist, song, genre, . . . ), song ratings (e.g., as rated by the user, by all or a subset of users subscribing to the media service, . . . ), or any other suitable information related to user preferences. Once personalized content has been aggregated, it can be downloaded to the user's device at 504. Download frequency (e.g., daily, weekly, . . . ), as well as download size (5 songs per download, 50 songs per download, . . . ) can be set by the user and/or based on user device capabilities (e.g., total memory, available memory, processing power, download rate, . . . ). In this manner, a user can receive media files that have a high probability of fulfilling user preferences without expressly requesting such files. It will be appreciated by those skilled in the art that although the method 500 is described with regard to music file downloads, any suitable media file can be utilized in conjunction with method 500 (as well as other methods described herein), such as video files, computer game files, etc.

Figure 6:
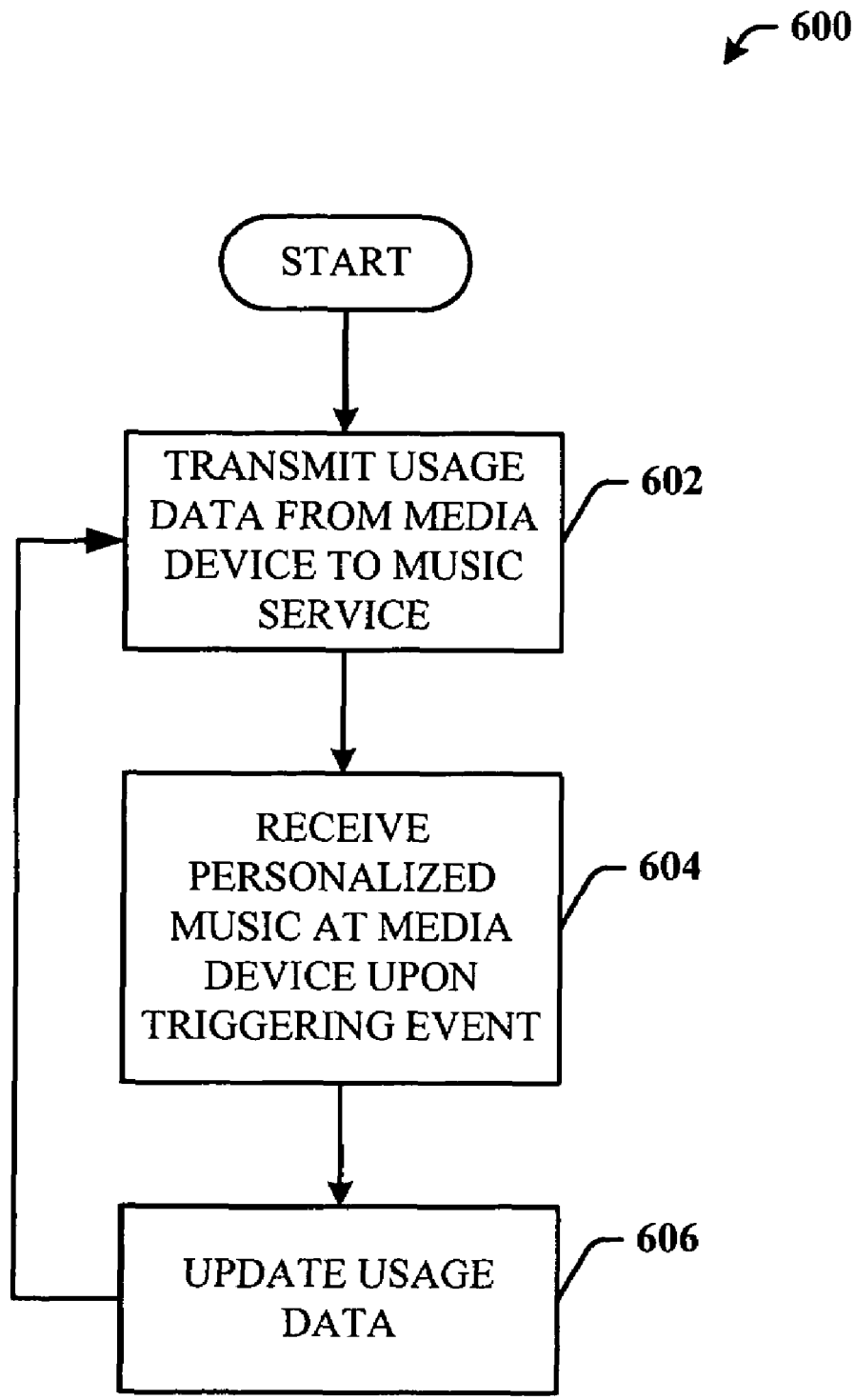
FIG. 6 illustrates a methodology for automatically downloading personalized media content to a user device in accordance with various aspects described herein.

FIG. 6 illustrates a methodology 600 for automatically downloading personalized media content to a user device in accordance with various aspects described herein. At 602, usage data, which can comprise any and all information related to user activity with regard to songs, playlists, media files, and the like, on the user's device, can be transmitted to a music service over the Internet. Usage data can comprise, without being limited to, content on the user's device, a number of times the user has played a song, a number of times the user has skipped a song, subscription information related to the users (e.g., whether the user has subscribed to a particular playlist, to another user, to a playlist generated by an automated process, . . . ), etc. Usage data can also comprise device recommendations, such as user-entered song ratings, files explicitly downloaded by the user and information related thereto, etc. Additionally, the music service can generate recommendations based on such information to provide personalized content to the user.

At 604, a triggering event can be detected that causes the personalized content to be downloaded to the user's device. The triggering event can be, for example, a pre-specified time (e.g., 5:00 am, 12:00 pm on Sunday, . . . ), or can be some other event, such as an update of a playlist to which the user is subscribed, a release of a new album by an artist for whom the user has indicated a preference, etc. According to other examples, the trigger event can be the generation of a new playlist by another user to which the user is subscribed. In the event that the user generating the playlist is a content editor or an automated process, brief advertisement content may be periodically and/or randomly inserted into the playlist, which can be associated with a particular company or product sponsoring the playlist. To further this example, a particular playlist comprising all classical music can be sponsored by a local symphony orchestra, in which case the symphony may desire to insert brief advertisements relating to upcoming concerts, ticket sales, guest conductors, and the like. According to another example, a playlist comprising largely independent music can be sponsored by a video game manufacturer who can insert advertisements related to its product periodically during the playlist. It will be appreciated by those skilled in the art that the foregoing examples are illustrative in nature and are not intended to limit the scope of the subject innovation.

At 606, usage data can be updated and the method can revert to 602 where the updated usage data can be provided to the music service to form a feedback loop whereby user information is constantly reviewed to facilitate generating the most current personalized content for download to the user. For instance, if a previous download of personalized content (e.g., at 604) comprises 10 song files, and the user has listened to one of the songs 12 times in the last 24-hour period, then the highly-played song can be indicative of an artist or genre that appeals to the user and can be weighted as being highly relative to personalized content for the user. Alternatively, if one of the songs has been sampled once by the user and then repeatedly skipped, or even expressly deleted by the user, then the song can be indicative of a negative relationship to user preferences, etc. In this manner continuous feedback can be utilized to facilitate providing personalized content that is current with a users changing preferences.

Figure 7:
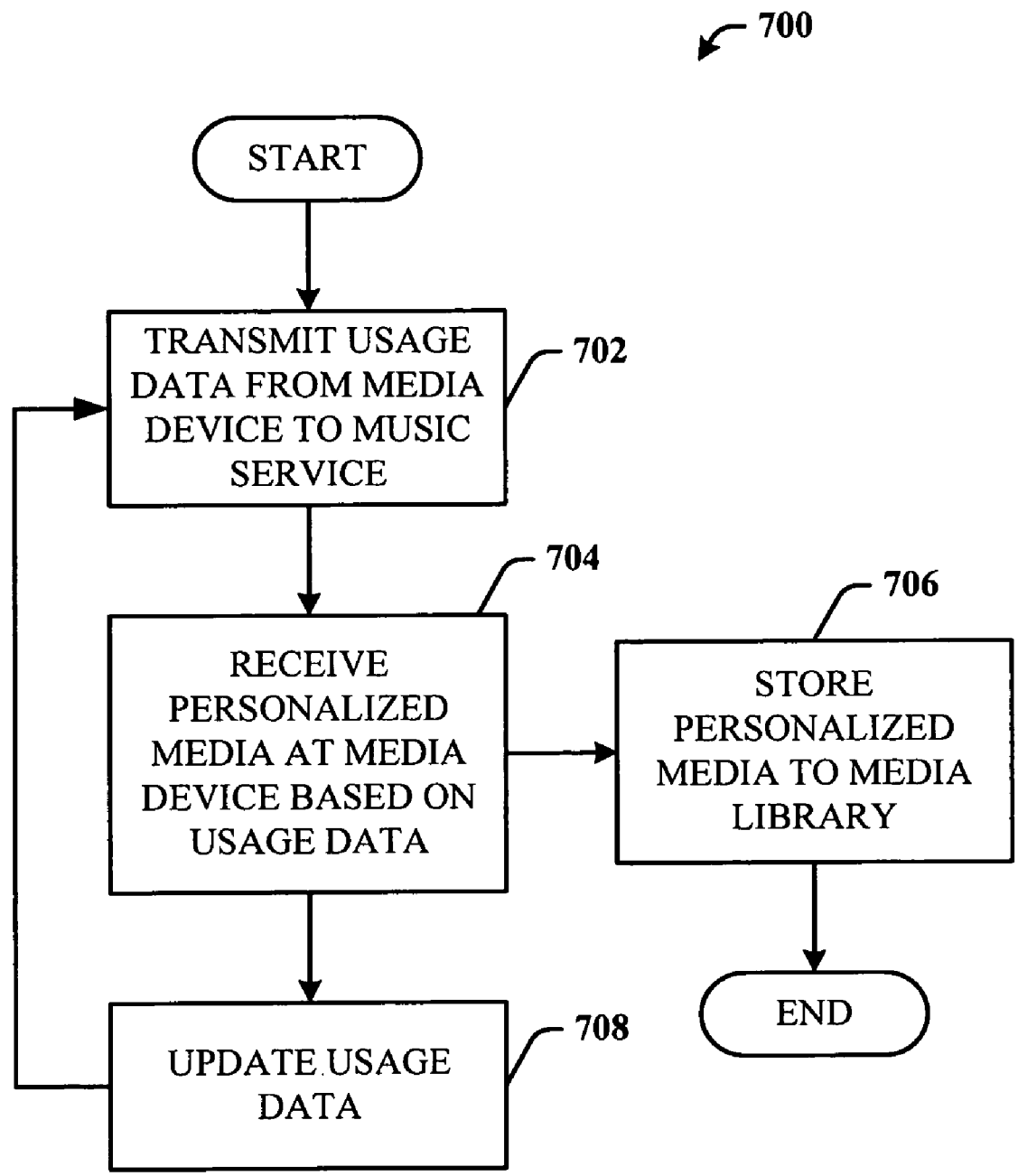
FIG. 7 illustrates a methodology for automatically providing content to a user device based on inferred user preferences, in accordance with one or more aspects.

FIG. 7 illustrates a methodology 700 for automatically providing content to a user device based on inferred user preferences, in accordance with one or more aspects. At 702, usage data can be transmitted from a user's media device to a music service. The music service can be, for example, an Internet-based service to which users subscribe to download music files (e.g. MP3s., .wav files, . . . ). The media device can be any suitable media device, such as an MP3-player or the like. At 704, personalized media can be received at the media device, wherein the personalized media comprises, for instance, songs that the media service has selected for the user based on the user's usage data. For example, if a user has played a certain song by Artist X multiple times over a pre-determined time period, then the personalized content can comprise other songs by Artist X, a newly-released album by Artist X, etc., because such content is deemed to be highly aligned with the user's preferences based on the usage data. Similarly, if a previously downloaded song has been skipped by the user most or all of the last N times the song has come up in the playlist rotation, then the song and/or artist can be negatively correlated to user preference, and other songs by the same artist can be limited or omitted from the personalized content automatically downloaded to the media device at 704.

At 706, the personalized media can be stored to the user's media library, which may be a data store residing in the media device or may be separate and distinct from the media device. For example, the media library can be a stored on a PC that has ample data storage space as compared to the user's media device, and to which the media device can connect (e.g., wirelessly and/or through a wired connection such as a USB cable, a coaxial cable, . . . ) to download and play songs at runtime. To further this example, the media library can reside separately from the media device and communicate therewith over a pre-designated radio frequency. According to this aspect, the media device can comprise a transceiver that receives a radio frequency from a base device associated with the media library and permits the user to hear a song as it is played from the media library. The media device can comprise an interface to permit the user to skip, replay, etc., songs in the user's media library, and such usage actions can be uploaded to the music service at 708 for another iteration of updating the user's profile based on usage, which in turn facilitates continuous modification of the personalized content that is automatically and periodically downloaded to the media device and/or library.

Figure 8:
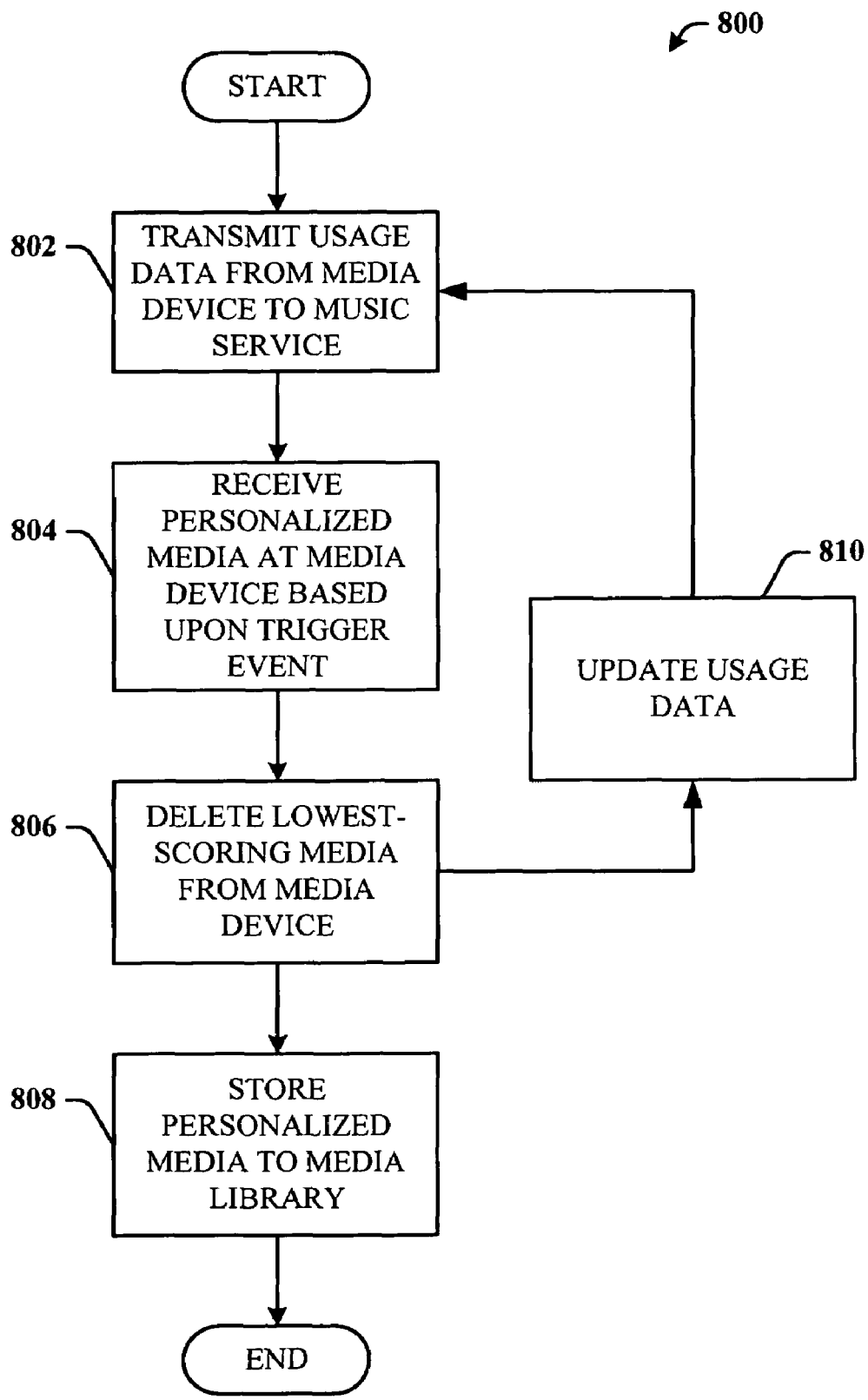
FIG. 8 is an illustration of a methodology for automatically pushing personalized media content to a subscriber and prioritizing media content at the subscriber's media device, in accordance with various aspects.

FIG. 8 is an illustration of a methodology 800 for automatically pushing personalized media content to a subscriber and prioritizing media content at the subscriber's media device, in accordance with various aspects. At 802, usage data can be transmitted from a user's media device to a music service. The usage data can comprise information related to media files on stored in the media device and user action(s) with regard thereto. For example, usage information can comprise a number of times the user has played a song in a predefined time period, a number of times a song has been skipped (e.g., when the song's play time in a playlist arises, . . . ), song(s) that were explicitly downloaded by the user, songs that were downloaded as personalized content (e.g., not expressly downloaded by user), or any other suitable information as described above. The personalized content can be downloaded to the user's media device upon a triggering event, which can comprise, for example, a specified temporal point, a recommendation (e.g., from another user, the media service, from the user device, . . . ), a newly released song or album, an update to a playlist or playlists to which the user has subscribed, or any other suitable triggering event, at 804.

In the event that that content needs to be removed from the media device (e.g., due to a memory limit that can be absolute, set by the user, etc.), content on the media device can be rated to determine which files to remove in order to make memory space available for incoming personalized content. For instance, a score can be assigned to each file stored in the device based on various factors, which may include without being limited to number of plays in a time period, number of skips in a time, whether the file was explicitly downloaded by the user or was downloaded automatically as personalized content, total time the file has been on the media device, etc., as described above. The N files with the lowest scores can be deleted at 806 to make room for N incoming files, where N is an integer that can be predefined or set by the user. Additionally, the user can be presented with a prompt to approve deletion of the N files, either individually or all at once.

At 808, the personalized media that has been automatically downloaded at 804 can be stored in available memory in, for example, a media library in the media device. Additionally, usage data can be updated at 810 based on the new content, and can be updated continuously and/or periodically during usage until a next triggering event occurs. The updated usage data can be provided to the media service (e.g., periodically, continuously, . . . ) to permit another iteration of the method at 802, and further automated download of personalized content to the user's device. In this manner, the user's media device can be populated with fresh, new media that is highly related to the user's preferences without requiring the user to explicitly request the media.

Figure 9:
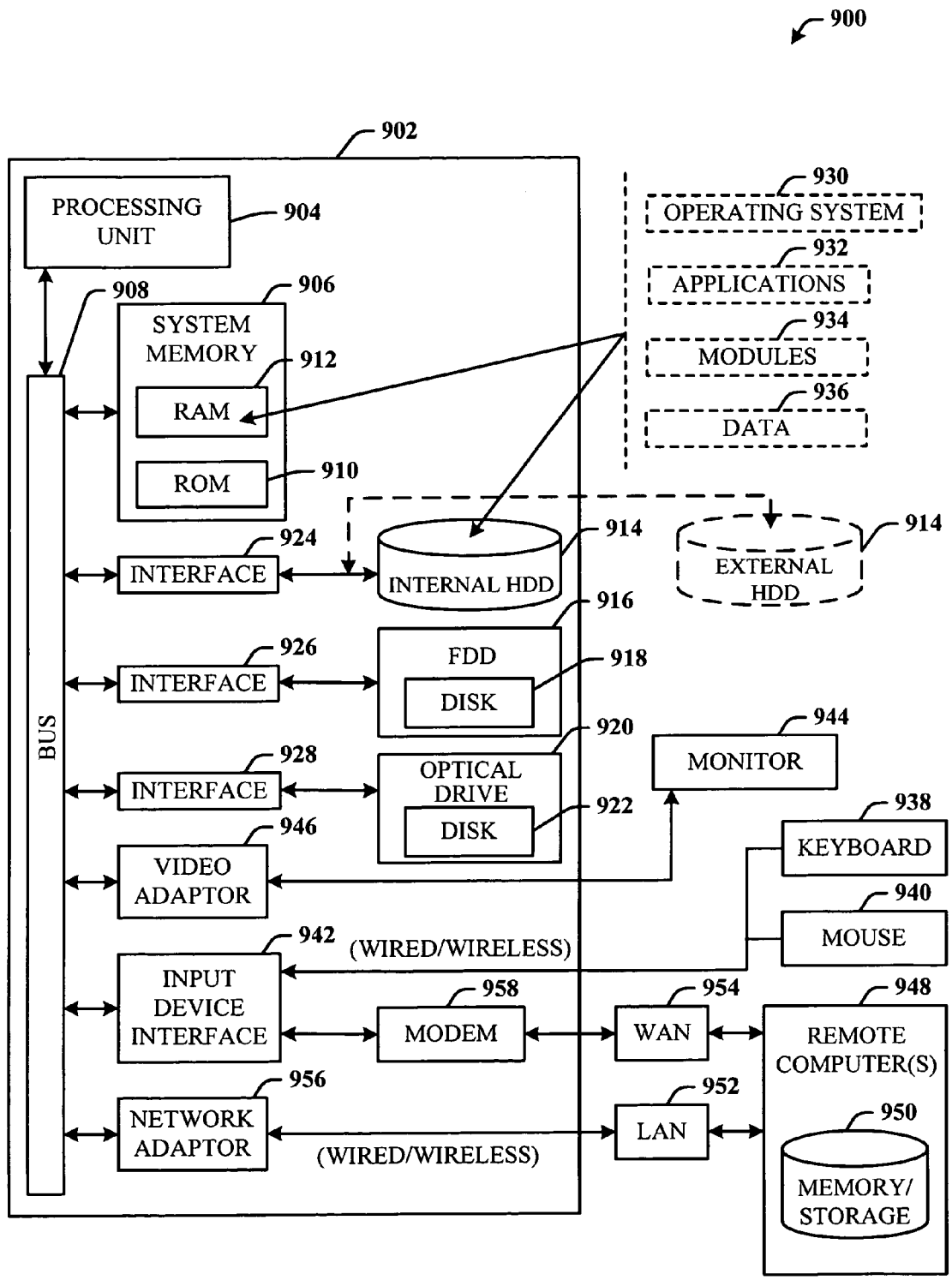
FIG. 9 illustrates a block diagram of a computer operable to execute the disclosed checkpointing architecture.

Referring now to FIG. 9, there is illustrated a block diagram of a computer operable to execute various aspects described herein. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 10:
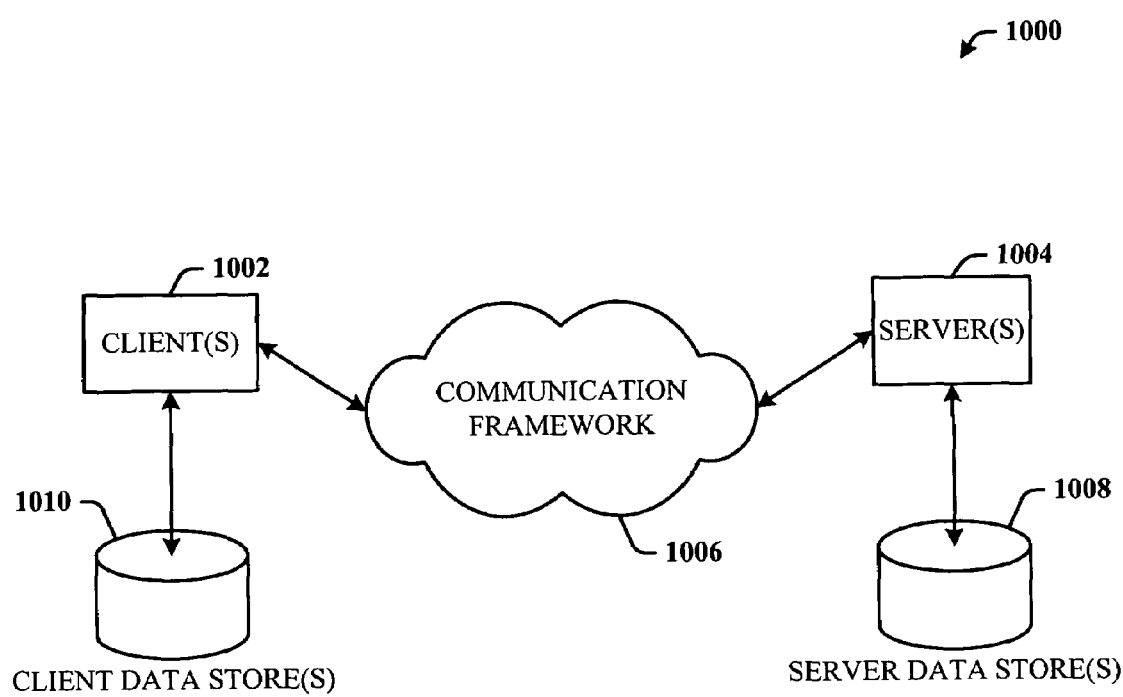
FIG. 10 illustrates a schematic block diagram of an exemplary two-tier client/server computing environment in accordance with various aspects.

Referring now to FIG. 10, there is illustrated a schematic block diagram of an exemplary two-tier client/server computing environment 1000 in accordance with various aspects. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1010 that can be employed to store information local to the client(s) 1002 (e.g., cookie(s) and/or associated contextual information). Similarly, the server(s) 1004 are operatively connected to one or more server data store(s) 1008 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates automatically delivering personalized content to a media device, comprising:

a computing system that implements a media service to provide media content for download to a media device of a user who subscribes to said media service, wherein media content that is downloaded to the media device comprises (i) user-downloaded media content that is explicitly downloaded by the user from the media service and (ii) personalized media content that the media service automatically compiles and pushes to the media device without an explicit request by the user, wherein:

the media service automatically compiles new personalized media content for the user based on at least one of (i) a recommendation of content from another user who subscribes to said media service and (ii) usage data that the media service periodically receives from the media device, said usage data comprising information related to user actions with regard to downloaded media content on the media device;

the media service automatically pushes the new personalized media content to the media device of the user, wherein the new personalized media content is automatically stored in currently available memory associated with the media device, and wherein if no memory is currently available, then automatically stored in memory that is made available by selectively removing stored media content with lowest priority among the currently stored media content of the media device; and stored media content is prioritized based at least on whether the stored media content is user-downloaded media content or personalized media content that was automatically pushed to the media device, such that stored personalized media content is selectively removed in favor of preserving user-downloaded media content stored on the media device.

2. The system of claim 1, wherein the media service automatically pushes new personalized media content to the media device upon the occurrence of a triggering event.

3. The system of claim 2, wherein the triggering event comprises a predetermined time of day.

4. The system of claim 2, wherein the triggering event comprises a recommendation of content by at least one of the media service, another subscriber approved by the user, or a content editor approved by the user.

5. The system of claim 2, wherein the triggering event is an update of a playlist to which the user has subscribed and wherein the update is included in personalized content that is pushed to the media device of the user.

6. The system of claim 2, wherein the triggering event is a new release of media content preferred by the user and wherein the newly-released media content is included in personalized content that is pushed to the media device of the user.

7. The system of claim 2, wherein the triggering event is a newly-released playlist created by a party to which the user has subscribed.

8. The system of claim 1, wherein the usage data further comprises a listing of all media content currently stored in a media library associated with the media device.

9. The system of claim 1, wherein the usage data further comprises rating information for media content currently stored by the media device.

10. A computer-implemented method of automatically downloading personalized media content to a user device, comprising:
sending usage data from a user device to a media service, wherein the usage data comprises information related to user actions with regard to a plurality of media files stored in the user device, the user actions comprising one or more of playing, skipping, or downloading one or more media files, and wherein the stored media files include (i) user-downloaded media files explicitly downloaded by the user from the media service and (ii) personalized media files automatically compiled by the media service and pushed to the media device without an explicit request by the user;
assigning scores to respective media files stored in the user device, wherein a score is assigned to a stored media file based at least on whether the stored media file is a personalized media file automatically pushed from the media service or a user-downloaded media file, wherein user-downloaded media files are assigned respective scores that are higher than respective scores assigned to personalized media files automatically pushed from the media service
receiving new personalized media files pushed from the media service, wherein said new personalized media files are automatically compiled by the media service based on at least one of the usage data sent from the user device and a user recommendation for one or more media files not stored in the user device and automatically pushed to the user device upon an occurrence of a triggering event;
determining whether the user device has sufficient available memory to store the new personalized media files pushed from the media service;
storing the new personalized media files in memory of the user device, if there is sufficient available memory;
if the user device does not have sufficient available memory to store the new personalized media files pushed from the media service, then liberating sufficient memory to store the new personalized media files by selectively deleting one or more stored media files having lowest assigned scores among the media files currently stored in the user device; and
periodically sending updated usage data to the media service.

11. The method of claim 10, wherein the triggering event comprises at least one of a predetermined time, an update to a playlist to which the user has subscribed, and a release of a new playlist that has been generated by a party to which the user has subscribed.

12. The method of claim 10, wherein the triggering event comprises at least one of a recommendation by the media service and a recommendation by a party that has been approved by the user.

13. The method of claim 10, wherein a score is assigned to a stored media file based at least on one or more additional factors including at least one of an amount of time the media file has been stored on the user device, a number of times the media file has been reviewed by the user, a number of times the media file has been skipped by the user, and a user rating of the media file.

14. The method of claim 13, further comprising obtaining user approval for selectively deleting stored media files having lowest overall scores.

15. A method of automatically downloading personalized media content to a media device, comprising:
determining preference information relating to respective media objects stored on the media device based at least in part on relative play frequencies of the respective media objects, relative skip frequencies of the respective media objects, download frequencies of media objects related to the respective media objects, and user relevance scores provided for respective media objects;
identifying a user recommendation for one or more media objects not stored in the media device;
queuing one or more new personalized media objects for automatic download to the media device based upon the preference information and the user recommendation;
generating priority information for respective media objects currently stored on the media device at least in part by assigning a primary priority to stored media objects that are user-downloaded media objects explicitly downloaded by the user from the media service and assigning a secondary priority to stored media objects that are personalized media objects automatically compiled by the media service and pushed to the media device without an explicit request by the user
determining whether sufficient available storage capacity exists on said media device for storing the queued one or more new personalized media objects;
if sufficient available storage capacity does not exist on said media device, removing from the media device, one or more stored media objects that are least preferred among a set of currently stored media objects to which the secondary priority has been assigned, based at least in part on the preference information; and
automatically pushing the queued one or more new personalized media objects to the media device upon a triggering event.

16. The method of claim 10, wherein the triggering event comprises identifying an update to a playlist to which the user has previously subscribed and wherein personalized media files pushed from the media service include one or more media files in the updated playlist that are not stored in the user device or one or more media files stored on the media device for deletion that were removed from the playlist in the update thereto.

17. The system of claim 1, further comprising at least one media device to access the media service over a communications network.

18. The system of claim 1, wherein the media content provided by the media service includes at least one of music content, video content and game content.

19. The system of claim 17, wherein the at least one device comprises a media library associated therewith, wherein downloaded media content is stored in the media library associated with the at least one media device, and wherein the at least one media device creates sufficient available storage at the media library by presenting the user a list of stored media content which is not user-downloaded media content, receiving from the user an indication of content from the list of stored media content that is designated by the user for removal, and removing the designated content from the media library.

20. The method of claim 10, wherein the media files comprise one or more of audio files, video files, or game files.

* * * * *